May 11, 1926.
O. F. ROE
TIRE CHAIN
Filed May 25, 1925
1,584,654
2 Sheets-Sheet 1
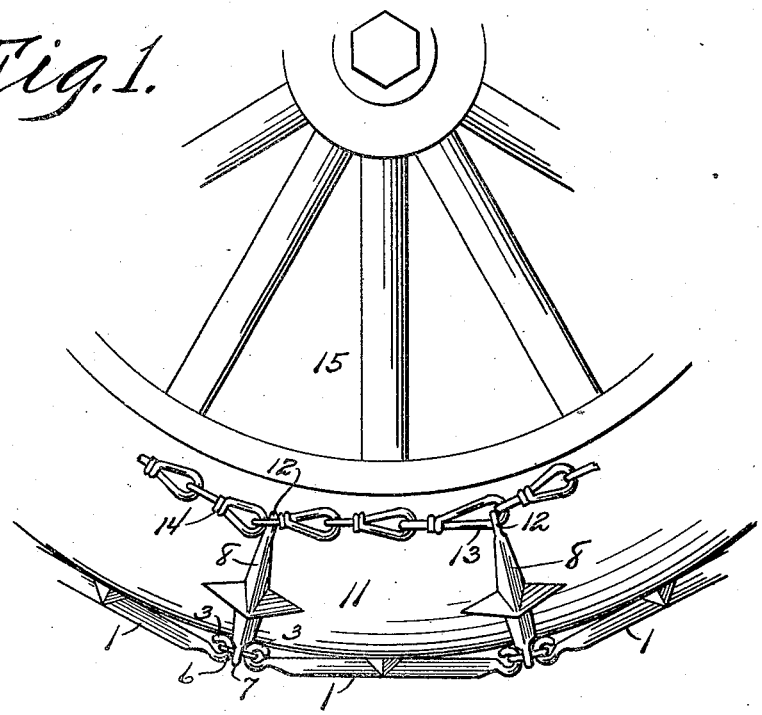
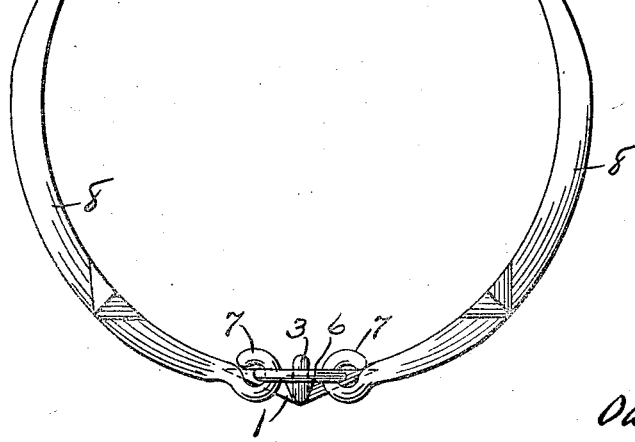

May 11, 1926.　　　　　O. F. ROE　　　　　1,584,654
TIRE CHAIN
Filed May 25, 1925　　　　2 Sheets-Sheet 2
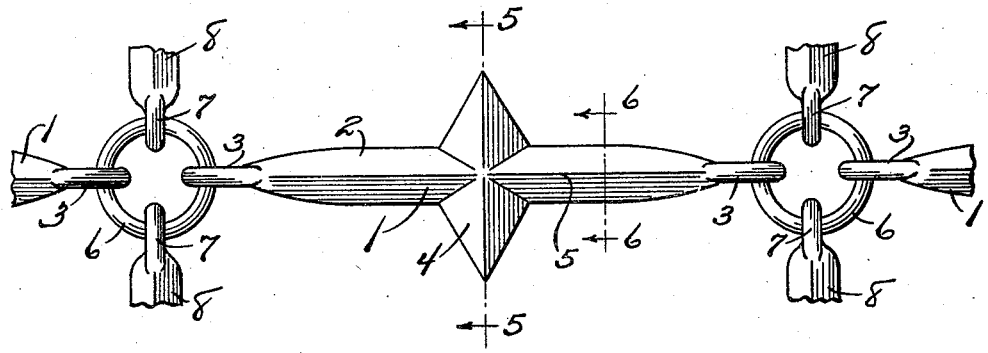
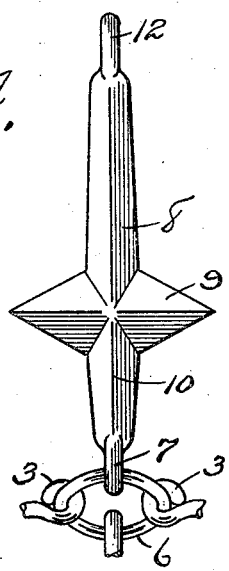
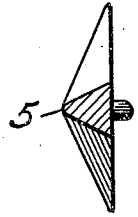
Odie F. Roe
INVENTOR
BY Victor J. Evans
ATTORNEY Patented May 11, 1926.

1,584,654

UNITED STATES PATENT OFFICE.

ODIE F. ROE, OF FLEMINGTON, WEST VIRGINIA.

TIRE CHAIN.

Application filed May 25, 1925. Serial No. 32,816.

My present invention has reference to an anti-skid chain for the tires of wheels, such as automobile wheels.

My object is to simplify and improve the existing art by producing an anti-skid chain for a tire that includes links designed to be arranged around the center of the tread surface of a tire, cross links connecting said circumferential links and side chains connecting the cross links for holding the device on the tire.

A further object is the protection of an anti-skid chain for pneumatic or other tires in which the links constituting the same are all of cross formation, the outer circumferential links being straight, the side links being rounded and designed to be connected with the ordinary chains for holding the device on a tire, and in which all of the cross links have their outer edges sharpened to positively insure a gripping engagement with the road surface to increase the traction of the wheel on icy or slippery surfaces and to likewise increase the traction when the vehicle travels through boggy thoroughfares.

A still further object is the provision of an anti-skid chain for pneumatic or other tires made up of links which are cross-shaped in plan, the longitudinal branches of all of the links being of a greater length than the lateral branches thereof, the said longitudinal branches having their ends terminating in eyes for the reception of rings that associate both the longitudinal and lateral elements of the chain, the outer eyes on the lateral or side members of the chain being connected with the links of ordinary side chains which attach the device to the tire, and the branches of all of the cross shaped links being substantially V-shaped in cross section to provide outer sharpened ground engaging edges.

With the above recited objects in view and others which will present themselves, as the nature of the invention is better understood, reference is to be had to the drawings which accompany and form part of this application.

In the drawings:

Figure 1 is a partial side elevation of a vehicle wheel provided with the improvement.

Figure 2 is an end view of the improvement.

Figure 3 is a partial plan view thereof.

Figure 4 is a plan view of one of the cross links.

Figure 5 is a sectional view on the line 5—5 of Figure 3.

Figure 6 is a sectional view on the line 6—6 of Figure 3.

As disclosed by the drawings, all of the links constituting my improved anti-skid chain, except the links of the securing or tying chains, are substantially cross-shaped in plan, but on the side links the lateral branches thereof are preferably disposed nearer the ends thereof which are connected to the central links. Also the central links are preferably of a greater length than the side links.

The central links are preferably indicated by the numeral 1. These links are straight throughout, the longitudinal branches 2 thereof having their ends reduced to form the same with eyes 3. The lateral branches 4 of the links 1 are centrally formed on the longitudinal branches. Both the longitudinal and lateral branches of the links 1 are substantially V-shaped in cross section so that the outer edges of said links are centrally pointed, as at 5, and the outer sides thereof are inclined in opposite directions. The eyes 3 of the confronting links 1 receive therethrough ring members 6 and to these rings there are also connected the inner eye members 7 on the side links 8. Except for the fact that the lateral branches 9 of the side links are disposed nearest the ends thereof secured to the rings 6, the side links 8 are all of a substantially similar construction to the longitudinal links, that is, the branches thereof are V-shaped in cross section to provide the same with central pointed edges 10. The side links also vary from the longitudinal links incident to the fact that the said side links are curved so that the inner flat faces thereof will snugly engage with the curved side of the vehicle tire 11. The inner eye portions 12 of the side links 8 are received through certain of the links 13 of the connecting chains 14. One of the end links of each of the attaching or connecting chains 14 is provided with the usual catch hook for engaging with the adjacent end link when the chain is applied.

The longitudinal links of my improvement are arranged at the center of the treaded portion of the tire 11 of the wheel 15 and therefore have a direct bearing on the ground surface. Because of their particular and peculiar formation the links 1 will embed themselves in any icy or soft road surface. The side links 8 will likewise embed themselves in a soft road surface so that the gripping engagement of the links with such surface will insure an effective traction between the wheel and the ground surface so that the vehicle may travel over an icy or boggy road or streets without danger of becoming mired. The chain construction is simple and may be manufactured as cheaply as are the ordinary anti-skid chains.

Having described the invention, I claim:—

1. An anti-skid chain for vehicle wheels comprising longitudinal links designed to be arranged centrally around the tread surface of a vehicle tire, cross links connected to the longitudinal links, chain members connected to the cross links for securing the device on the tire, and the said longitudinal and cross links being each substantially cross-shaped in plan.

2. An anti-skid chain for vehicle tires, comprising longitudinal links, which are flat and of an equal thickness throughout and designed to be arranged centrally around the tread surface of the vehicle tire, said longitudinal links being cross-shaped in plan, the lateral and longitudinal branches being V-shaped in cross section and the longitudinal branches terminating in eyes, rings connecting the eyes of the confronting links, cross links which are also cross shaped in plan and have their ends provided with eyes, one of which engaging the mentioned rings, the lateral branches of the cross links being of a less length than the longitudinal branches thereof and being disposed nearest the ends of the longitudinal branches which are connected to the links, both branches of the cross links being V-shaped in plan and the said cross links being curved and attaching chains connected to the inner eyes of the cross links.

In testimony whereof I affix my signature.

ODIE F. ROE.